AMPLITUDE LIMITER WITH PHASE CONTROL

Filed May 13, 1968

INVENTOR.
JOSEPH R. HOOVER,
BY
Allen A. Dicke, Jr.,
AGENT

United States Patent Office 3,548,215
Patented Dec. 15, 1970

3,548,215
AMPLITUDE LIMITER WITH PHASE CONTROL
Joseph R. Hoover, Encino, Calif., assignor to Hughes Aircraft Company, Culver City, Calif., a corporation of Delaware
Filed May 13, 1968, Ser. No. 728,654
Int. Cl. H03k *5/08*
U.S. Cl. 307—237 1 Claim

ABSTRACT OF THE DISCLOSURE

A conventional amplitude limiter has output phase change upon peak chopping of input signals of different amplitude because of wave form differences at different amplitudes. An additional cause of phase change is the storage time of transistors used in such amplitude limiters. To compensate for these output phase changing causes, a detuned LC circuit is connected into the conventional amplitude limiter circuit. Different amplitudes of the input signal cause different equivalent shunt resistances related to the LC circuit. This in turn changes the Q of the circuit to provide a phase change in the LC circuit which compensates for phase changes due to changes in input amplitude. The result is an amplitude limited output signal without substantial phase change. If desired, the LC circuit can be tuned to provide an advancing or delaying phase shift with input signal level changes.

BACKGROUND

This invention is directed to an amplitude limiter which limits the signal output thereof to a predetermined maximum amplitude, and which is provided with phase control to relate the phase of the output signal to the input signal level.

The requirement that a circuit or system provide a constant output signal level is found in many systems in the electronic arts. Peak choppers and the like have been provided to obtain this desired result. However, the most satisfactory limiter is the current mode amplitude limiter because it provides good limiting performance. However, its disadvantage is that the fundamental component of the signal suffers a phase shift between the signal input and signal output terminals as the input level changes. At higher frequencies this phase shift change becomes serious and can be as much as 60°. This degrades the performance of systems based on phase comparison techniques.

SUMMARY

In order to aid in the understanding of this invention, it can be stated in essentially summary form that it is directed to an amplitude limiter with phase control. The amplitude limiter contains means to transmit positive and negative going signals up to a predetermined maximum amplitude, and phase control means connected thereto to control the phase relationship between the output and input signals in accordance with requirements.

DESCRIPTION

Figure 1:
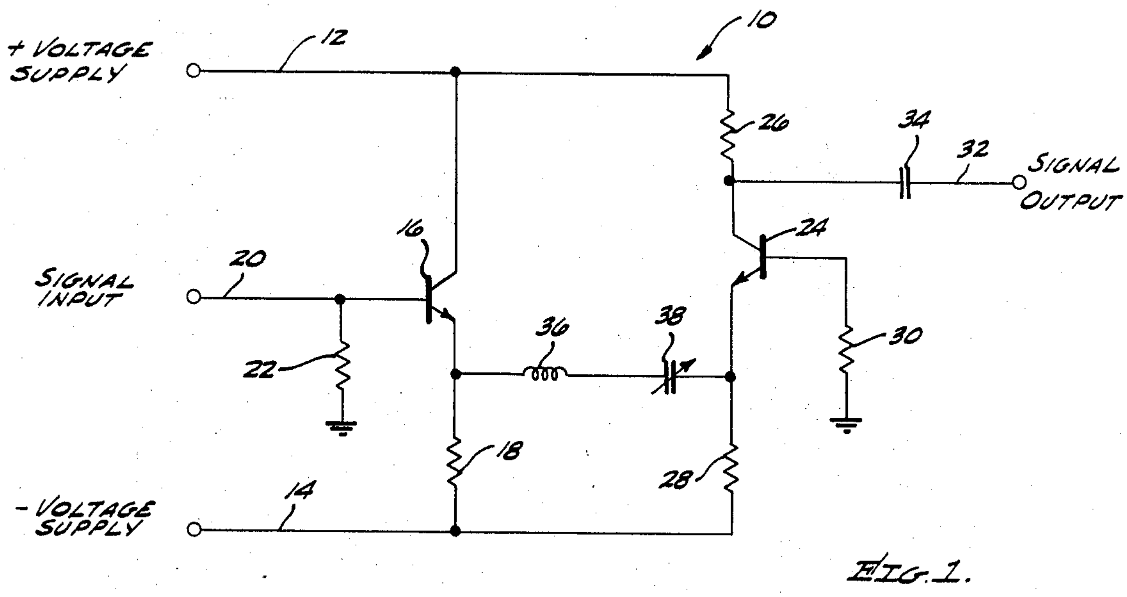
FIG. 1 is an electrical schematic drawing of the amplitude limiter with phase control.

Referring to FIG. 1, the amplitude limiter with phase control is generally indicated at 10. It comprises a positive voltage supply line 12 and negative voltage supply line 14 between which transistor 16 is connected. Transistor 16 has its collector connected to line 12 and its emitter connected line 14 through resistance 18. Signal input line

20 is connected to the base of transistor 16 and is also connected through resistor 22 to ground.

Similarly, transistor 24 has its collector connected through resistor 26 to line 12 and its emitter connected through resistor 28 to line 14. In addition, the base of transistor 24 is connected through resistor 30 to ground. Output signal line 32 is connected through capacitor 34 to the collector of transistor 24. In addition, to connect transistors 16 and 24, inductor 36 and capacitor 38 are serially connected therebetween.

For purposes of describing operation, it is first assumed that instead of serially connected inductor 36 and capacitor 38, the emitters of transistors 16 and 24 are interconnected by a line. It is seen that for small signal variations in input line 20 transistor 16 is connected to operate as an emitter follower and transistor 24 is connected to operate as a common base amplifier so that signal output line 32 has a signal therein corresponding to the input signal polarity. However, when the positive and negative going pulses in signal input line 20 exceed a predetermined maximum value, the peaks are chopped therefrom so that the resultant signal in output line 32 is amplitude limited. During the positive going portion of a large input signal on line 20, emitter follower transistor 16 raises the emitter voltage of transistor 24 thereby cutting it off since its base is grounded by resistor 30. This action results in an amplitude limited positive going signal on line 32. During the negative going portion of a large input signal on line 20 the emitter base junction of transistor 24 goes into conduction, as its base is grounded through resistor 30, and its emitter is pulled negative by transistor 16. This results in clamping the emitter of transistor 16 so that the input signal cuts it off and therefore limits the negative going signal on line 32. Therefore, the center section of the input wave form, that which does not exceed predetermined limit values, passes through the circuit to appear in signal output line 32. However, both the positive and negative going peaks beyond this predetermined value are cut off.

There are two causes in the circuit for changes in the phase shift of the output signal in line 32 with respect to the signal in input line 20. The first cause involves the storage time of transistors 16 and 24, especially when they are driven far into conduction and then to cutoff. The second cause is that with different amplitudes of input signal, the slope of the wave form is different, so that when cutoff occurs at the predetermined limiting value, such cutoff occurs in different points of time for different amplitudes. As a result of this, objectionable phase shifts occur, especially at high frequencies.

Figure 2:
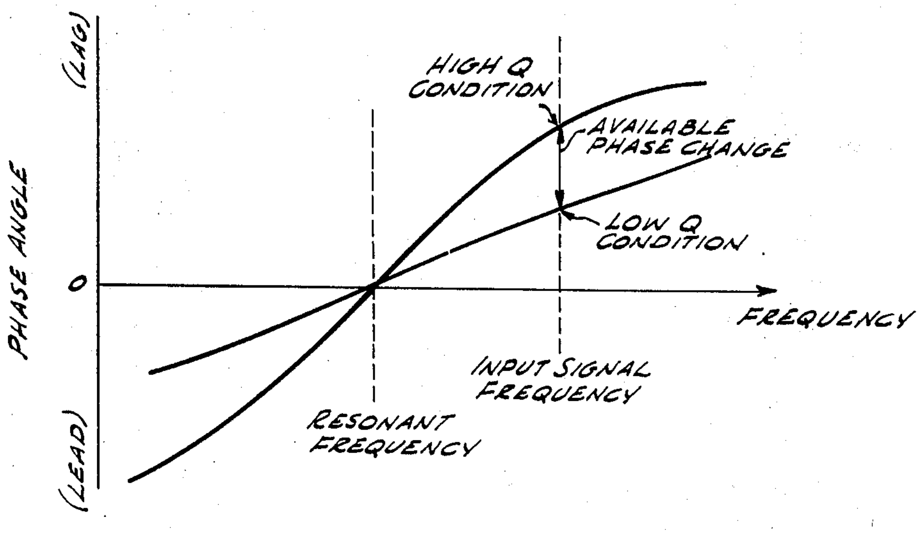
FIG. 2 is a graph showing the limits within which phase control is obtainable.

Inductor 36 and capacitor 38 are serially connected between the emitters of transistors 16 and 24 to compensate for this phase shift. Since the phase shift changes with different amplitudes of input signal, the compensation applied by the LC circuit comprised of inductor 36 and capacitor 38 must vary with input amplitude. This is accomplished by providing an LC network which is slightly de-tuned from resonance at the signal input frequency. The quality factor Q is defined as the capacitive reactance divided by the resistance of a circuit. In the present circuit, the effective loading resistance of transistors 16 and 24 is included in the resistance factor. Since this resistance changes, with different conductive circumstances of the transistors, the Q of the circuit changes. As is shown in FIG. 2, which is extracted from "Radio Engineers Handbook," 1943 edition, page 140, a change in Q when the circuit is tuned away from the operating frequency results in a phase change through the LC circuit controls the amount of phase change. With proper adjustment of either inductance 36 or capacitor 38, the proper corrective phase change is achieved so that the phase in output signal line 32 is very close to the phase in the signal input line. Furthermore, should a particular phase change be desired, the LC circuit can be adjusted to incorporate that phase change.

With a positive supply voltage of 12 volts, a negative supply voltage of 12 volts, an input signal frequency of 120 megacycles, and with the component values in the following table, an amplitude limited output signal of 180 mv. P/P appears in line 32. The phase shift of the signal in line 32 with respect to the input signal in line 20 is only plus or minus 5 degrees for an input signal amplitude variation of 30 db.

| | Component | Value or Identification |
|---|---|---|
| Reference No.: | | |
| 16 | Transistor | 2N2857. |
| 18 | Resistor | 1,000 ohms. |
| 22 | do | 51 ohms. |
| 24 | Transistor | 2N2857. |
| 26 | Resistor | 51 ohms. |
| 28 | do | 1,000 ohms. |
| 30 | do | 51 ohms. |
| 34 | Capacitor | .01 mfd. |
| 36 | Inductor | 4½ turns, 5/16" diameter, close wound, #18 solid enameled wire. |
| 38 | Capacitor | 1–20 PF variable. |

As is indicated in the drawing, capacitor 38 is preferably adjustable. This adjustment is necessary for proper phase control because part of the compensation for undesired phase shift is for the phase shift resulting from storage time in transistors 16 and 24. Such storage time varies between individual transistor units, and thus for optimum performance the LC circuit must be properly tuned for the particular components involved.

Thus, the LC circuit comprised of inductance 36 and capacitor 38, together with the equivalent loading resistance of this system, acts to sense amplitude variations which would cause changes in the overall phase shift and produces an effect which compensates for that amplitude variation created phase shift. Of course, as noted above, the amount of correction or compensation can be selected so that if the lead or lag is desired, such can be obtained.

This invention, having been described in its preferred embodiment, it is clear that it is susceptible to numerous modifications and embodiments within the ability of those skilled in the art and without the exercise of the inventive faculty. Accordingly, the scope of this invention is defined by the scope of the following claims.

What is claimed is:

1. An amplitude limiter comprising first and second noncomplementary transistors, a voltage supply of a first value connected to the collector of said first transistor and through a resistance to the collector of said second transistor, the emitter of said first transistor being conneced to a voltage supply of second value through an emitter resistor and the emitter of said second transistor being connected to the voltage supply of second value through an emitter resistor, a signal input line connected to ground and to the base of said first transistor, the base of said second transistor being connected to ground, and an output signal line connected to the collector of said second transistor so that said first transistor is connected to operate as an emitter follower and said second transistor is connected to operate as a common base amplifier for providing an amplitude-limited signal in said output line corresponding to the signal in said signal input line, the improvement comprising:

an inductor and a capacitor serially connected between the emitters of said first and second transistors so that the base-to-emitter resistance of said transistors acts with the inductor-capacitor network to vary the circuit Q to control the amount of phase change between the signal input and signal output lines in accordance with input signal amplitude.

References Cited

UNITED STATES PATENTS

| | | | |
|---|---|---|---|
| 3,290,433 | 12/1966 | France et al. | 307—237X |
| 3,323,070 | 5/1967 | Hayes | 330—30X |
| 3,386,041 | 5/1968 | Bell | 307—246X |
| 3,465,170 | 9/1969 | Lavallee | 307—237 |

DONALD D. FORRER, Primary Examiner

J. ZAZWORSKY, Assistant Examiner

U.S. Cl. X.R.

307—262; 330—20, 21

PO-1050
(5/69)

UNITED STATES PATENT OFFICE
CERTIFICATE OF CORRECTION

Patent No. 3,548,215 Dated December 15, 1970

Inventor(s) J. R. Hoover

It is certified that error appears in the above-identified patent and that said Letters Patent are hereby corrected as shown below:

Column 1, line 72, after "connected", insert --to--. (Page 3, line 12).

Column 2, line 68, after "LC", insert --network. Thus, the amount of loading of the LC--.

Signed and sealed this 22nd day of June 1971.

(SEAL)
Attest:

EDWARD M.FLETCHER,JR.
Attesting Officer

WILLIAM E. SCHUYLER,
Commissioner of Patan